United States Patent [19]

Utasi

[11] Patent Number: 4,610,005
[45] Date of Patent: Sep. 2, 1986

[54] VIDEO BOREHOLE DEPTH MEASURING SYSTEM

[75] Inventor: Joseph G. Utasi, Cincinnati, Ohio

[73] Assignee: Dresser Industries, Inc., Dallas, Tex.

[21] Appl. No.: 161,190

[22] Filed: Jun. 19, 1980

[51] Int. Cl.$^4$ .............................................. B21B 47/04
[52] U.S. Cl. ..................... 367/33; 358/107; 73/151.5
[58] Field of Search ............... 73/151.5; 358/99, 100, 358/105, 107, 139; 367/33

[56] References Cited

U.S. PATENT DOCUMENTS

| | | |
|---|---|---|
| 2,166,212 | 7/1939 | Hayward . |
| 2,221,767 | 11/1940 | Hayward et al. . |
| 2,287,819 | 6/1942 | Nichols . |
| 3,261,967 | 7/1966 | Rosin et al. ............... 358/107 |
| 3,406,298 | 9/1968 | Janeway .................. 358/107 |
| 3,651,871 | 3/1972 | Greene ..................... 33/132 |
| 3,853,004 | 12/1974 | Westlake et al. .......... 73/151.5 |
| 4,179,707 | 12/1979 | Sjödin ...................... 358/107 |
| 4,204,224 | 5/1980 | Buken et al. ............. 358/107 |
| 4,254,433 | 3/1981 | Dewar, Jr. et al. ....... 358/105 |

FOREIGN PATENT DOCUMENTS

| | | | |
|---|---|---|---|
| 0134258 | 2/1979 | Fed. Rep. of Germany | 358/107 |
| 0515931 | 5/1976 | U.S.S.R. | 358/107 |
| 0520727 | 7/1976 | U.S.S.R. | 358/107 |

OTHER PUBLICATIONS

Hojabeam et al., "Electronic Anamorphasis System", 4/79, IBM Tech. Disc. Bull., vol. 21, #1.

*Primary Examiner*—Nelson Moskowitz

[57] ABSTRACT

A video system measures the position of the traveling block of a drilling rig to determine borehole depth and the rate of drill bit penetration. A television camera is arranged to track the vertical movement of the traveling block of a drilling rig between its uppermost and lowermost positional limits. An encoding unit is connected to the television camera. The output of the encoder indicates the block's position along its vertical path of movement. The output signal is processed to provide information such as borehole depth and drill bit penetration rate. The output may be in the form of an analog output to a dial indicator, a chart recorder or the like. The system is not subject to fouling or mechanical failure and the system, including the input sensor, may be located in its entirety remotely from the drilling rig.

5 Claims, 2 Drawing Figures

VIDEO BOREHOLE DEPTH MEASURING SYSTEM

BACKGROUND OF THE INVENTION

The present invention relates to the art of earth boring and, more particularly, to borehole depth measurement and measurement of drilling parameters for an oil well drilling rig. During the drilling of an oil or gas well or the like, it is necessary to obtain information on drilling parameters such as the rate of penetration through the earth formations, the depth of the well, etc. Difficulties that must be overcome in providing a system for measuring such parameters are the extremes of the working environment at a drilling rig, severe acoustical problems at a drilling rig, and electrical and radio frequency noise and other problems created by the operation of heavy machinery at the drill site. Generally, the drilling rig and equipment mounted therein are subject to severe vibration and the nature of the equipment and the workmen handling such equipment results in the equipment being subjected to severe abuse during operation.

DESCRIPTION OF PRIOR ART

In U.S. Pat. No. 2,166,212 to John T. Hayward, patented July 18, 1939, an apparatus for measuring well depths and well strings is shown. A method of measurement is accomplished by attaching a measuring line to the conventional traveling block from which the drilling or casing strings are normally suspended as they are run in and out of the well, and measuring the linear movement of the measuring line, by means of a conventional calibrated measuring wheel, as the line follows the upward and downward movements of the block between the crown and floor of the derrick in raising or lowering the drill string.

This patent also identifies other prior art systems of measuring depth. Well depths can be measured by measuring the length of the drill pipe as the drilling proceeds. This is done by measuring with a steel tape each section of drill pipe as it is added to the drill string. Another method of measurement includes lowering a weighted line into the well until the weight on the end of the line strikes the bottom of the well and the line is measured by means of a calibrated measuring wheel as it descends or is pulled from the well.

In U.S. Pat. No. 2,221,767 to John T. Hayward and Elihu H. Cooley, patented Nov. 19, 1940, an apparatus for measuring well depths and well strings is shown. Improvements in the electrical apparatus providing connection between the switching mechanism and the rotary table in the electro-magnetic clutch connected to the register to replace the slip ring mechanism employed in the apparatus is shown. The slip ring connection is open to several serious objections to its use in and around well drilling equipment because the contact surfaces of slip ring and brush connections are easily opened and exposed to oil, grease, dirt and mud ever present about the drilling rig. Imperfect contact may frequently result with consequent imperfect operation of the measuring apparatus and there is also danger of arcing which may produce sparks which might be exceedingly disastrous when oil or gas is present about the well as is frequently the case.

In U.S. Pat. No. 2,287,819 to Paul Briscoe Nichols, patented June 30, 1942, a device for recording drilling operations is shown. A recorder operable in conjunction with a rotary drilling rig for graphically recording drilling operations is shown. Its principal object is to provide a mechanism of this character for automatically recording the time that the drill is in operation, speed of penetration through the earth formations and depth of drilling.

In U.S. Pat. No. 3,651,871 to Palmer G. Greene, patented Mar. 28, 1972, a drilling rig depth control is shown. The illustrated system monitors the depth at which a drilling rig is operating and indicates when a predetermined depth is reached by recording the length traveled by the drill pipe supporting member in a predetermined direction within the mast of the drilling rig, comparing the length traveled with a predetermined length, distance or measurement and producing a signal when the two are equal. This may be a prealarm signal or a final alarm signal. Preferably the signal sounds an alarm and automatically interrupts power to the drill pipe supporting member.

In U.S. Pat. No. 3,853,004 to J. H. Westlake et al, patented Dec. 10, 1974, methods and systems for measuring, displaying and recording time rate of penetration are shown. The provision of means to measure, display and record the rate of a boring bit penetration during a drilling process by measuring the movement of the bit supporting cable and interpreting said measurement to include the time of the penetrating movement of the bit and thereafter displaying and recording said time rate of penetration of said bit.

SUMMARY OF THE INVENTION

The system of the present invention utilizes a video camera to locate the position of the traveling block of a drilling rig vertically above the drilling rig floor. This position indication provides information and a data base that is used to totalize depth, calculate the rate of penetration of the drill bit or provide other information. The invention overcomes extremes of environment, acoustic, electrical and radio frequency noise and operates under severe vibration and abuse. The system is positioned remote from and does not have direct contact with moving elements of the drilling rig. The prior art systems generally use a line over a pulley at the crown fastened to the block, or a turns counter on one of the block pulleys. The prior art approaches are subject to fouling and mechanical failure and present difficult and tedious installation problems. The set-up and operation of the video system of the present invention is relatively safe compared with the prior art systems. The above and other features and advantages of the present invention will become apparent from a consideration of the following detailed description of the invention when taken in conjuction with the accompanying drawings.

DESCRIPTION OF THE PREFERRED EMBODIMENTS

Figure 1:
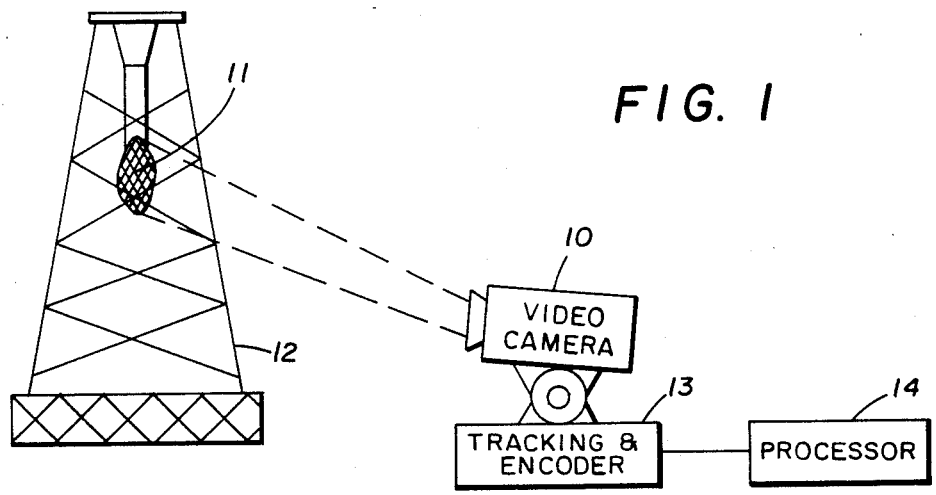
FIG. 1 illustrates an embodiment of a system constructed in accordance with the present invention.

Referring now to FIG. 1 of the drawings, an embodiment of the present invention is illustrated that provides a video system for measuring the position of the traveling block of a drilling rig to determine borehole depth, rate of drill bit penetration and other information. A video television camera 10 is arranged to track the vertical movement of traveling block 11 of drilling rig 12 between its uppermost and lowermost positional limits. A tracking and encoder unit 13 is connected to television camera 10. The output of the encoder indicates the block's position along its vertical path of movement. The output signal is processed by unit 14 to provide various information such as borehole depth, penetration rate and rate function. The information is provided in the form of analog outputs to a dial indicator, chart recorder or the like. The system is not subject to fouling or mechanical failure and the system, including the input sensor, may be located in its entirety remotely from the moving elements of the drilling rig.

TV tracker 13 with a suitable mounting platform is employed to gather data to be used by the system to derive the direction and rate of movement of drilling rig block 11. In order to derive the motion of block 11 from geometrical measurements, three independent quantities must be determined. The most convenient quantities in the measurement are baseline, block travel and TV camera pointing angle. The base and height measurements are made with normal tape measuring procedures. The pointing angle is determined by an angular shaft encoder mounted on a precision rotary TV camera table. A direct readout of the pointing angle is continuously transmitted to processor 14.

The camera 10 may be, for example, an RCA TC Series Camera which uses a standard CCTV format and lens system. The camera 10 is mounted on a precision rotary table such as an Aerotech Model ATS-301MR. This arrangement allows a ½-arc minute of travel per step of control. Jitter and positional uncertainty is thereby significantly less than the allowable accumulated system pointing error. Also, during rapid block travel, the mount can easily track the block during the fastest angular rate. The field of view is determined by the worst case angular measurement granularity which can be accommodated conveniently. At the highest vertical block position, a nominal number of TV lines of 6 per inch of target may be established. This provides a field of view of 1.4. At the maximum height, a total of 80 inches of block travel is displayed on one TV scan. The block travel computation is not totally dependent on the exactness in camera pointing accuracy. The rate of TV line-to-line image motion as determined by the tracker is scaled trigonometrically by the pointing angle.

The camera, optics, motor driven rotary table and shaft position encoder are preferably mounted within an insulated and heated weatherproof housing. Optics access is through a protected window. A shroud of sufficient dimensions to exclude wind blown water and other environmental hazards may be used. A heated chamber for the camera electronics is desirable due to the extremely low temperatures in which the system must operate. An accumulation of ice and snow can be tolerated by the housing. Heated optics with automatic window (lens) cleaning and anti-fogging can be provided. Some dirt and dust on the lens is not a serious problem. The accumulation of water, ice and snow, however, is and must be eliminated. A heated and properly drained lens or window assembly will alleviate this problem.

The mounting system allows alignment of camera 10 in the vertical plane (same plane as the traveling block). An external TV monitor can be used to prove this, although a sighting transit would be suitable. The camera is swung through its full arc of travel. The boresight of the system using the traveling block and its cable as the reference plane are sighted. Rotation and pointing in the mounting assembly are adjusted for alignment. When set, no further adjustment is required. The assembly is clamped (or bolted) fast and remains undisturbed until further adjustment checks or other changes are made.

The output video signal from camera 10 is applied to processor 14. Processor 14 actually comprises three processing units. The first unit is a video processor for receiving the video signal from camera 10 and for digitizing the signal for further processing within unit 14.

The digitized signal is delivered to a digital processor comprising the second unit of processor 14. The digital processor performs the high-speed accumulation of data and generates signals indicative of parameters such as: target size, and target position.

The signals from the digital processor are supplied to the third processing unit of processor 14; this unit comprises a microprocessor for calculating the actual position of block 11. Preferably the microprocessor is configured as a microcomputer. The program for the microcomputer may be modified for special system requirements to satisfy individual user specifications.

In operation, camera 10 continually tracks the vertical movement of block 11 and together with the angular shaft encoder mounted on tracker 13 provide signals to processor 14 indicative of the actual position of block 11. Processor 14 may accept signals at the rate of 30 samples per second to increase the accuracy of the calculated position of block 11.

The program for the microcomputer unit of processor 14 includes inputs means for indicating when the drill bit is spaced from the bottom of the borehole. This input modifies the signals generated by camera 10 tracking block 11 when the drill string is vertically moving, but the drill bit is not in contact with the bottom of the borehole. Such movement of the drill string occurs, for example when additional lengths of drill pipe are added to the string or when the drill bit is replaced. The position of the drill bit relative to the bottom of the borehole can be readily determined by means such as hook load indicators, with such indicators generating signals for delivery to processor 14.

Figure 2:
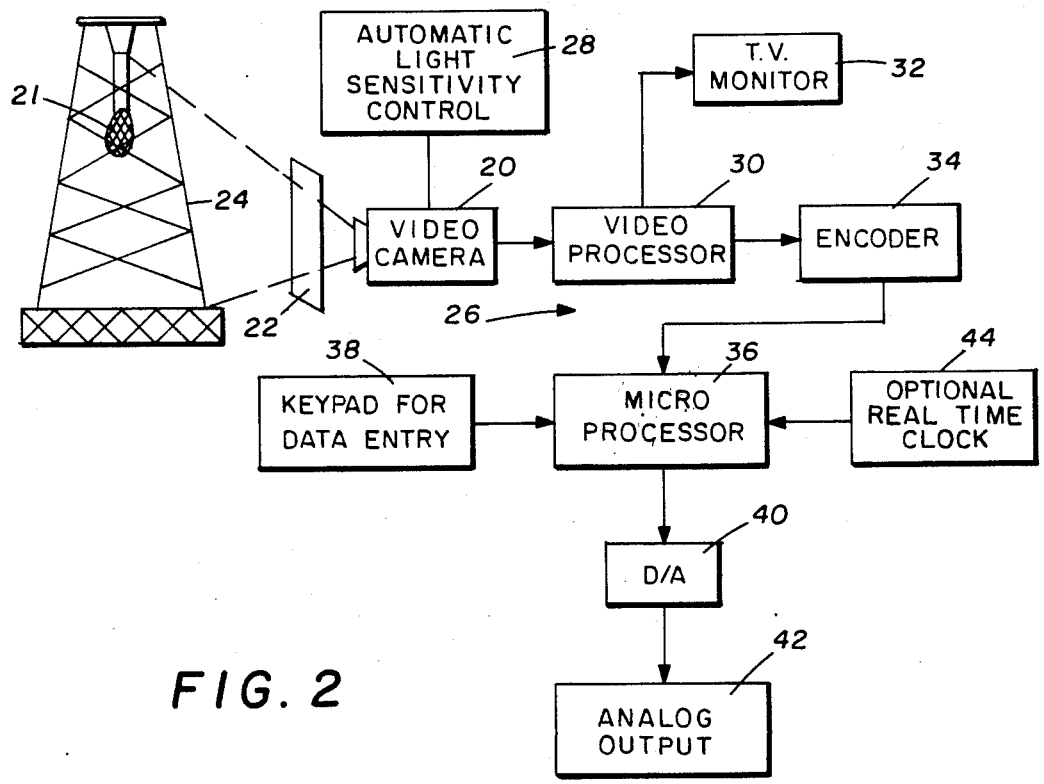
FIG. 2 illustrates another embodiment of the present invention.

Referring now to FIG. 2 of the drawings, a modified form of the present invention is illustrated. The system illustrated in FIG. 2 includes a video television camera 20 arranged to view, through an optical filter 22, the vertical movement of traveling block 21 of a drilling rig 24 between its uppermost and lowermost positional limits. A video data processing unit 26 is connected to the output of television camera 20, which output indicates the block position along its vertical path of movement. The output signal is processed to provide various information, such as borehole depths and penetration rate in the form of analog outputs to a dial indicator, chart recorder or the like. The system, like the system of FIG. 1, is not subject to fouling and mechanical failure and may be located in its entirety remotely from the drilling rig. Video television camera 20 includes an automatic light sensitivity control 28 and is connected via a standard coax cable to remotely located processing unit 26. This remote unit comprises video processor 30 TV monitor 32, encoder 34, microprocessor 36 with data entry keyboard 38 and D/A converter 40.

The structural details of the second embodiment of the system constructed in accordance with the present invention having been described the operation of this embodiment will now be considered. For all practical purposes, a drilling rig is stationary while drilling a borehole. Movement is restricted to the traveling block and its associated hardware, and this movement is primarily in a vertical direction. The system of the present invention locates the vertical position of the traveling block with respect to the rig floor. The real time video camera 20 includes an appropriate lens system. Camera 20 is positioned so that the maximum possible block travel will fall within the field of view of the camera. Once this is accomplished, the camera is locked permanently in position.

In order to enhance the recognition of the traveling block by the camera system, block 21 may be painted in its entirety or partially with some uniquely different color. Alternatively, target shapes or objects may be painted or attached to the block to achieve the desired video recognition. An optical band pass filter 22 with complementary characteristics is fitted in front of the camera lens. Thus the first step is taken to identify the block from background clutter.

Traveling block 21 is placed in its lowest expected position and this event is identified by actuating a button on the data entry keypad 38. Block 21 is next raised to its highest expected position and this event is identified by actuating a different button on data entry keypad 38.

Because of non-optimum camera positioning and parallax error, the apparent size (vertically measured) of block 21 as seen by camera 20 will vary, being slightly smaller at the top of its travel. The sizes initially loaded into processor 36 at the upper and lower block positions can be interpolated by the processor and used as a check on the block position; however, the primary means of block location is the total quantity and position of horizontal video lines in which the optically filtered block image is present. Thus the apparent or real shape of the block is irrelevant as long as the height does not change. Since the block is made of steel and weighs several tons this can be considered fixed.

By feeding both the video output signal and the vertical position signal to processor 36, it can determine where between the two set limits the block lies. Since only black and white video technology will be utilized, the total number of horizontal lines can be increased to achieve desired accuracy. For a block travel of 100 feet or 1200 inches, 1200 horizontal lines would yield ±1 inch accuracy. A digital to analog converter 40 outputs data in a standard format to an analog output 42. This may be a dial indicator, digital meter, or strip chart recorder.

Utilizing the abilities of microprocessor 36, a Rate of Penetration output is provided. A real time clock 44 input to processor 36 and another instruction set enables the system to calculate the rate function. The entire system is mounted some distance from rig 24, away from the mud, vibration and hostile environment and thus does not need to be explosion-proof or intrinsically safe. This reduces manufacturing cost, and increases reliability.

The program for microprocessor 36 is suitably modified to accommodate any vertical movement of the traveling block not involved in the borehole drilling process, such as when additional drill pipe is being added to the drill string.

While preferred embodiments of the present invent have been described and illustrated, the invention should not be limited thereto, but may be otherwise embodied within the scope of the following claims.

The embodiments of an invention in which an exclusive property or privilege is claimed are defined as follows:

1. A method of determining penetration of a drill string into the earth utilizing an element of a drilling rig, comprising:
    providing a target on the element of the drill rig;
    positioning a video camera at a remote location relative to the drill rig
    placing the video camera within a waterproof housing at said remote location;
    directing the video camera at said target; and
    tracking the movement of said target with said drill string into the earth.

2. A method of measuring penetration of a drill string into the earth wherein the drill string is attached to an element of a drilling rig, comprising:
    positioning a video camera at a remote location relative to the drilling rig;
    placing the video camera within a weatherproof housing at said remote location;
    directing the video camera at said element of the drill string;
    causing said video camera to track movement of said element;
    determining the angular movement of said video camera; and
    determining penetration of said drill string utilizing said angular movement.

3. Apparatus for measuring penetration of a drill string into the earth, comprising:
    a drilling rig element that moves simultaneously with movement of said drill string;
    a video camera positioned at a remote location relative to the drilling rig;
    weatherproof housing means disposed about said video camera at said remote location;
    means for causing said video camera to follow movement of said drilling rig element and generating a movement signal; and
    means for measuring the penetration of said drill string utilizing said movement signal.

4. Apparatus for measuring penetration of a drill string into the earth comprising:
    an element operatively connected to said drill string for movement therewith;
    a video camera positioned at a remote location relative to the drill string for visually monitoring movement of said element and for generating a signal indicative of said movement;
    weatherproof housing means disposed about the video camera at remote location; and
    means for measuing penetration of said drill string ulitzing said movement signal.

5. Apparatus in accordance with claim 3 wherein said measuring means includes a processing unit.

* * * * *